US008250185B2

(12) United States Patent
Bauer et al.

(10) Patent No.: US 8,250,185 B2
(45) Date of Patent: Aug. 21, 2012

(54) SEMANTIC MATCHING OF FEDERATION INTENTS AND SERVICES CAPABILITIES IN A PLANNING SYSTEM FOR AUTOMATIC SERVICE FEDERATION

(75) Inventors: Daniel Bauer, Zurich (CH); Kristijan Dragicevic, Zurich (CH); Luis Garces-Erice, Zurich (CH); Minkyong Kim, Scarsdale, NY (US); Hui Lei, Scarsdale, NY (US); Hao Yang, Montrose, NY (US)

(73) Assignee: International Business Machines Corporation, Armonk, NY (US)

( * ) Notice: Subject to any disclaimer, the term of this patent is extended or adjusted under 35 U.S.C. 154(b) by 183 days.

(21) Appl. No.: 12/732,441

(22) Filed: Mar. 26, 2010

(65) Prior Publication Data

US 2011/0238795 A1    Sep. 29, 2011

(51) Int. Cl.
*G06F 15/177* (2006.01)
(52) U.S. Cl. ......... 709/220; 709/217; 709/218; 709/219
(58) Field of Classification Search ........... 709/217–220
See application file for complete search history.

(56) References Cited

U.S. PATENT DOCUMENTS

| | | | | |
|---|---|---|---|---|
| 2005/0138413 | A1* | 6/2005 | Lippmann et al. | 713/201 |
| 2006/0265508 | A1* | 11/2006 | Angel et al. | 709/230 |
| 2007/0253344 | A1* | 11/2007 | Frost et al. | 370/254 |
| 2007/0258508 | A1* | 11/2007 | Werb et al. | 375/140 |

OTHER PUBLICATIONS

Brahim Medjahed et al., "Composing Web Services on the Semantic Web," The VLDB Journal (2003) 12: pp. 333-351; Digital Object Identifier (DOI).
Medjahed et al., "A Multilevel Composability Model for Semantic Web Services," IEEE Transactions of Knowledge and Data Engineering, vol. 17, No. 7, Jul. 2005, pp. 954-968.

* cited by examiner

*Primary Examiner* — Mohamed Wasel
(74) *Attorney, Agent, or Firm* — Cantor Colburn LLP; Daniel Morris

(57) ABSTRACT

A method, device, and computer program product are provided for automatically generating connectivity configuration between domains by a device. A rule is received by the device. The rule is read by the device to determine a first domain invoking a service, a second domain having the service, and connectivity requirements for the first and second domains. A first proxy and a second proxy are automatically determined to fulfill the rule by the device. The first proxy is automatically assigned to the first domain and the second proxy is automatically assigned to the second domain.

20 Claims, 5 Drawing Sheets

SEMANTIC MATCHING OF FEDERATION INTENTS AND SERVICES CAPABILITIES IN A PLANNING SYSTEM FOR AUTOMATIC SERVICE FEDERATION

BACKGROUND

Exemplary embodiments relate to a service oriented architecture (SOA), and more specifically, to a planning engine for computing proxies.

The service-oriented architecture (SOA) has been very successfully applied in enterprise environments. Due to decentralized set-ups, mergers and acquisitions and organizational boundaries, many enterprises today operate multiple, fragmented services infrastructures that use heterogeneous technologies and are administered by different organizational units. Enterprises are integrating their business operations more tightly and enterprises are looking for tighter integration of their information technology (IT) environments in order to avoid service duplication and redundancy.

Technically, one may consider the best integration is achieved if all service domains are merged into a single, homogeneous, enterprise-wide service domain. Such an approach, however, may be considered unrealistic in most settings. Many enterprises favor an approach with multiple service domains for organizational reasons. Also, the costs to move toward a technologically coherent environment could be very high.

BRIEF SUMMARY

According to one exemplary embodiment, a method is provided for automatically generating connectivity configuration between domains by a device. A rule is received by the device. The rule is read by the device to determine a first domain invoking a service, a second domain having the service, and connectivity requirements for the first and second domains. A first proxy and a second proxy are automatically determined to fulfill the rule by the device. The first proxy is automatically assigned to the first domain and the second proxy is automatically assigned to the second domain.

Additional features are realized through the techniques of the present disclosure. Other systems, methods, apparatus, and/or computer program products according to other embodiments are described in detail herein and are considered a part of the claimed invention. For a better understanding of exemplary embodiments and features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features of the present disclosure are apparent from the following detailed description taken in conjunction with the accompanying drawings in which:

DETAILED DESCRIPTION

Service Oriented Architecture (SOA) has seen rapid adoption in enterprise computing. One main plus of SOA is service reuse. Services are units of functionality that are offered by a server through a network for client applications to use them. To make different applications with different requirements (re)use the same service(s), connectivity is needed between service consumers (the applications) and service providers (the infrastructure hosting the service implementations). Connectivity middleware such as Enterprise Service Bus (ESB) provides four basic principles of connectivity: visibility, management, security, and governance. Traditionally, the deployment of SOA has started separately in individual business units inside the same company: some departments saw first the need to implement an SOA; the company started an SOA trial in one business unit before committing to a company-wide deployment; an SOA infrastructure was inherited from another company being acquired, etc. The services within a particular business unit (usually mapped to a particular segment of the enterprise network), the associated connectivity middleware (ESB), and the necessary service registry and repository form what may be called a service domain. The incremental nature of SOA adoption typically results in islands of service domains that are not connected. Each island contains machines that offer services to (client) applications in their own network.

Exemplary embodiments are configured to enable greater service reuse and scale up the SOA scope, by providing a cross-domain server integration. Businesses desire to have federated connectivity among the different service domains. A federated service domain effectively connects through the network these islands of SOA domains together to form an enterprise-spanning SOA according to exemplary embodiments. A federation then is a set of service domains with connectivity among them configured such that at least one service of some provider domain is made available at other domains.

Figure 1:
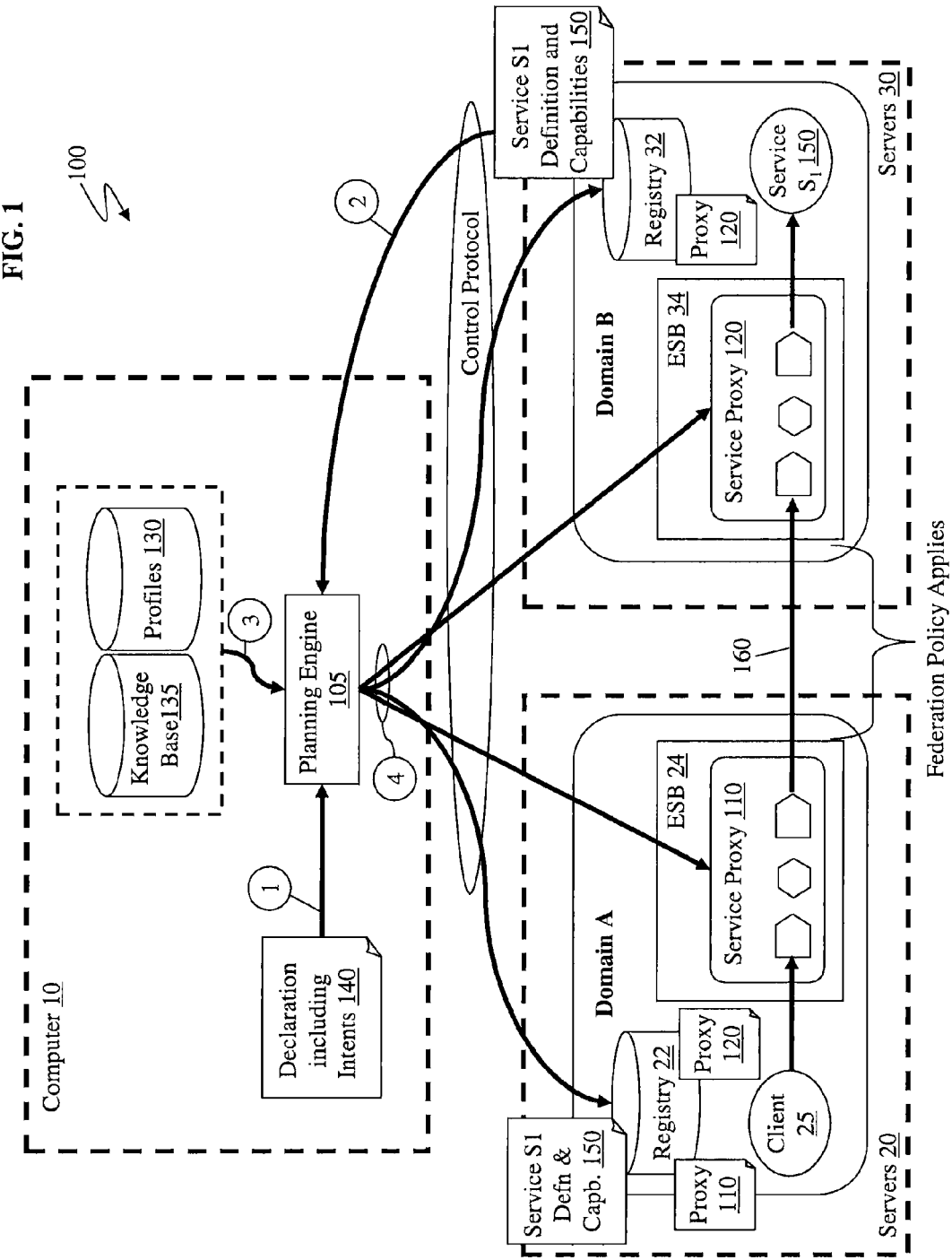
FIG. 1 illustrates a block diagram of a system in accordance with exemplary embodiments.

Now turning to FIG. 1, FIG. 1 illustrates a block diagram of a system 100 in accordance with exemplary embodiments.

FIG. 1 illustrates domain A and domain B. Domain A and domain B may be distributed across multiple computing devices such as multiple severs via a network, and for conciseness domain A is depicted in server 20 and domain B is depicted in server 30. A domain hosting some service to be used by other domains is called a provider domain. For explanation purposes, the domain B is illustrated as the provider domain. In order to federate services across domains, services have to be made visible at the domains where the client applications use said services. For example, an administrator may desire a client application 25 in domain A to utilize one or more services of domain B. To federate (integrate) domains, services have to be made visible where the client application uses the services. A service may be made visible at one domain by introducing a description, such as a Web Services Description Language (WSDL) file in the registry of that domain. For example, a service can be made visible at domain A, by introducing a description of the service $S_1$ in the registry 22 of domain A. The client application 25 can be representative of numerous applications that access a service, such as user applications on a user device, another service, etc.

The domain A and domain B are each illustrated with respective Enterprise Service Busses (ESBs) 24 and 34.

Exemplary embodiments provide cross-domain service integration through an automated federation of Enterprise Service Busses (ESBs). In SOA architecture, ESBs are the switching centers within a service domain that enable service interaction across technological boundaries by using service mediations and service proxies. Based on the logic of a planning engine 105, the planning engine 105 is configured to automatically determine, select, and implement service proxy 110 in the ESB 24 of domain A and service proxy 120 in the ESB 34 of domain B. A service proxy is an element used between a client application and a service to enable connectivity between them. Proxies, like services, need to be made visible for applications to use them. In exemplary embodiments, there may be a number of reasons why a proxy may be needed, e.g., because some transformation of the communication between the application and the service is required and/or because the service itself cannot be made visible outside the domain (such as domain B), but a proxy of the same service can, etc.

The planning engine 105 is configured to automate the manual configuration of service visibility and service proxies by 1) using as input a rule-based federation declaration 140 that 2) is processed by the planning engine 105, which 3) generates the appropriate configuration for the domains A and B to instantiate (the service proxies 110 and 120) the federation.

Further, the planning engine 105 (which may be referred to as a Declarative Inter-ESB Service-Connectivity Configuration Engine) is an automated configuration engine that computes the connectivity features required by client applications (such as the client application 25) accessing services in the domains (such as the domain B) of a SOA networked environment based on 1) the semantic content as discussed herein of connectivity rules as expressed by the system administrator and 2) the capabilities and requirements of the services (e.g., service $S_1$) available on the different domains, such that connectivity can be established between applications and services in the federation. In the present disclosure, the high-level connectivity rules are referred to as federation intents 140 and the system administrator (on a computer 10) performing the domain federation is referred to as a federation architect. The planning engine 105 implements the required connectivity by instantiating service proxies, such as service proxies 110 and 120, with the required functionality between the clients (client application 25) and the services (such as the service $S_1$). The planning engine 105 selects service proxies 110 and 120 (or their respective proxy pattern) from a catalog of proxies in the federation profiles database 130. Also, the planning engine 105 is configured to detect whether a service capability (of, e.g., service $S_1$) is a superset of a federation intent and whether no service proxy is needed, even if the service capability is expressed using a different syntax than the federation intent. Also, the planning engine 105 detects incompatibilities between service capabilities of services and federation intents. As a consequence, only semantically correct service execution paths are computed by the planning engine 105. A service execution path is a sequence of connectivity steps required for a service to be executed by a client: For example, a client C using a service S through a proxy P would have a service execution path C→P→S.

An example operation description is provided below for illustration purposes only but not limitation.

Operation 1: The federation architect may input into the computer 10 a federation declaration 140 that defines where services will be visible and how these services will be accessed from outside the provider domain B. How a service is accessed is captured in what is called a federation intent 140. The federation intent 140 is a qualifier for the connectivity between the domains (which are domains A and B) where client applications (e.g., client application 25) are hosted and the services (e.g., $S_1$ 150) they use at the provider domains (e.g., domain B). For example, the federation intent 140 might demand in a rule that encryption is used when invoking the service $S_1$ from domain B. The federation declaration and intent 140 is received and processed by the planning engine 105.

Figure 2:
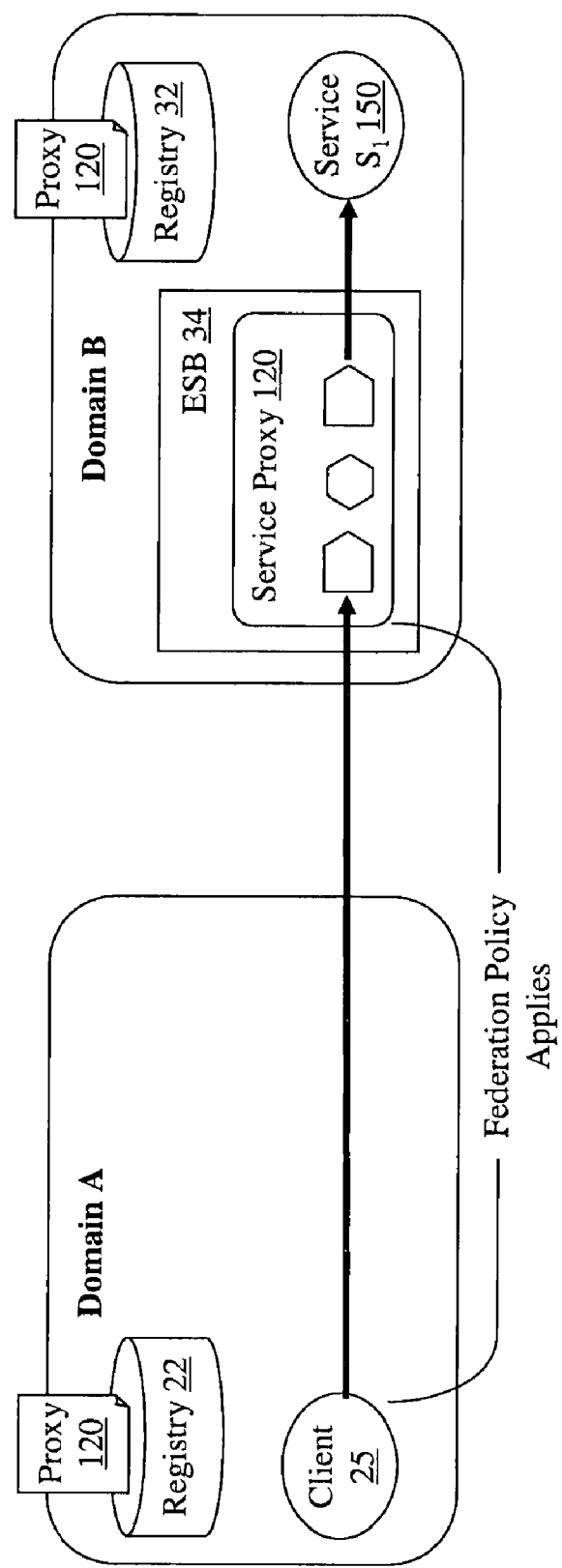
FIG. 2 illustrates a block diagram of a system in accordance with exemplary embodiments.
Figure 3:
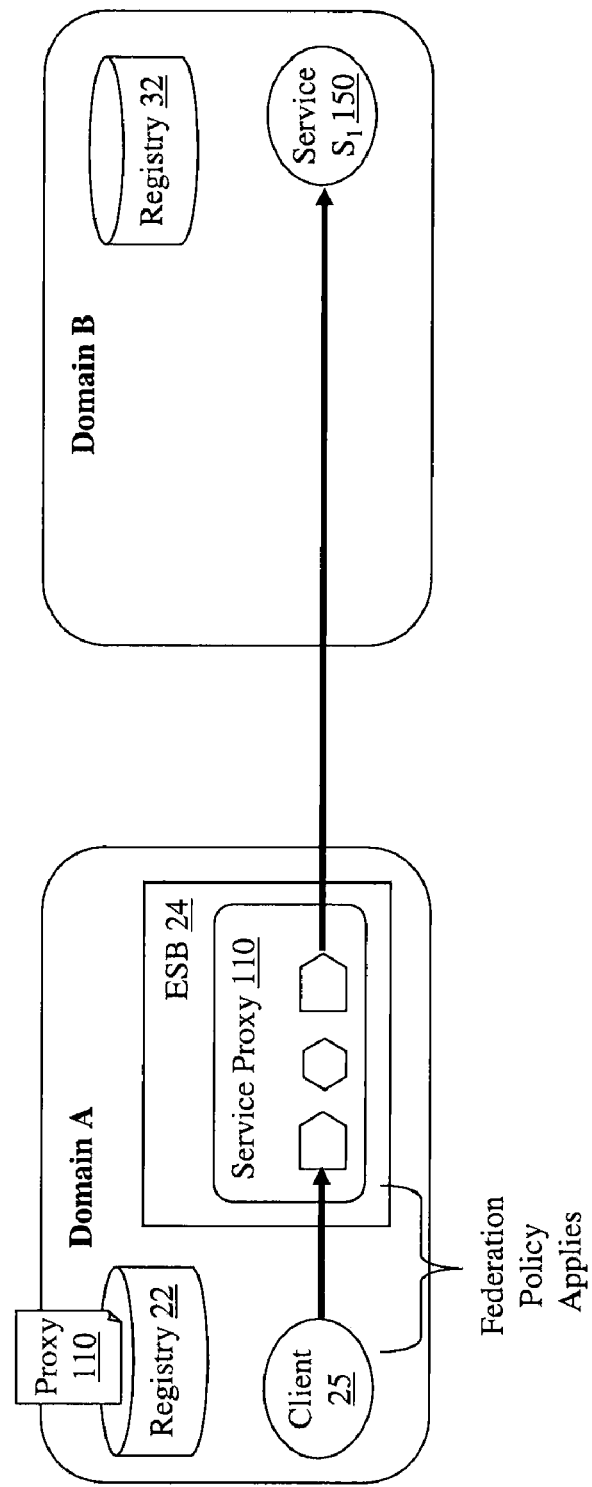
FIG. 3 illustrates a block diagram of a system in accordance with exemplary embodiments.

Operation 2: The planning engine 105 utilizes a control protocol to read the state of the federation from the registries 22 and 32. One skilled in the art understands a control protocol. An example of a control protocol may be considered a simple network management protocol (SNMP) for the services infrastructure, but it is understood that exemplary embodiments are not meant to be limited to SNMP. The planning engine 105 is configured to query the devices (such as the registries 22 and 32) in the enterprise network, which are the domains A and B. For each of the registries 22 and 32, the planning engine 105 respectively obtains (e.g., reads) the state, and the state consists of a set of service domains, the services available therein as well as the runtime infrastructure such as registries and enterprise services buses (ESBs) that are available in the domains. For domain B, the planning engines 105 reads registry 32 and obtains information about service $S_1$ 150 and the ESB 34. The planning engine 105 reads the service definition and capabilities for service $S_1$ 150 (along with any other services). Likewise, the planning engine 105 reads registry 22 and obtains information about the ESB 24. If ESBs were missing in either domain A or B, the planning engine 105 is configured to implement the federation declaration 140 as shown in FIGS. 2 and 3.

Operation 3: The planning engine 105 is configured to compute a configuration plan for the runtime environment that satisfies the federation declaration 140, and as such, the configuration plan computed by the planning engine 105 determines that services proxies 110 and 120 are to be deployed in domains A and B, respectively. For this purpose, the planning engine 105 accesses a federation profile database 130 that contains federation proxy patterns and a knowledge base 135 that comprises semantic information about service proxies (such as the service proxies 110 and 120), about their configuration, and about their compatibility with each other. Also, the federation proxy patterns are constraints on the combinatorial space of all services proxies (e.g., services proxies 110 and 120) available in the catalog of the federation profile database 130 to implement connectivity between domain A and domain B. Based on the federation declaration and intents 140 input by the system administrator, based on the definition and capabilities of the service S1 150 from the registry 32, based on the federation proxy patterns from the federation profile 130, and based on semantic compatibility information from the knowledge base 135, the planning engine 105 determines and selects the services proxies 110 and 120 to fulfill the federation declaration and intents 140.

Operation 4: The planning engine 105 deploys the computed configuration plan on the federation, using again the control protocol. In this case, the planning engine 105 deploys the service proxy 110 in the ESB 24 of domain A and deploys the service proxy 120 in the ESB 34 of domain B. As a result of this deployment, registry entries are created in registry 22 and registry 32 along with deploying the service proxies in the different service domains. The registry entries are populated with service definitions and are used to make a service visible in a foreign domain, and the service proxies are deployed to provide the non-functional and connectivity aspects of service invocation according to the federation architect's intent. For example, a registry entry is entered in registry 22 to include information about the newly added service proxy 110, the newly available service $S_1$ 150, and the provider domain's service proxy 120. The arrow 160 indicates that the service proxy 110 calls (invokes) the service $S_1$ in domain B via domain B's service proxy 120. The line 160 is the execution path from service proxy 110 to service proxy 120. The registry 32 is (may be) updated with this new information which includes the newly added service proxy 120.

As result of the above operations, the planning engine 105 outputs a federation configuration plan that consists of visibility configuration and service proxy location and type. The location and type of service proxies are derived from both federation intents 140 and the underlying service capabilities (e.g., of service $S_1$ 150.) The result is a set of proxies that fulfills the requirements of the intent 140, while producing functional and efficient connectivity between client applications (client application 25) and services (service $S_1$). Although examples may reference one or two domains for explanation purposes, it is understood that exemplary embodiments apply for numerous domains, numerous services, and numerous proxies.

As illustrated in system 100, the configuration by the planning engine 105 resulting from the federation policies 140 is implemented by introducing the appropriate proxies 110 and 120 (respectively) at both the ESB 24 of the service domain A where the service invocation originates and the ESB 34 of the service domain B hosting the service (hosting domain). For an administrator, this may be the desired method for introducing connectivity features between domains, first, because this allows the use of the client applications without modification, as the proxies take care of implementing the required functionality for the federation policy, and second, because this allows for optimization techniques, like caching, to be implemented at the service domain (e.g., domain A) where the invocations originate.

The planning engine 105 may encounter situations where an ESB is not available in a service domain. In accordance with exemplary embodiments, FIGS. 2 and 3 illustrate modifications to the system 100, in which the ESB 24 is removed in domain A of FIG. 2 and the ESB 34 is removed in domain B of FIG. 3. Although understood by one skilled in the art, note that each element in FIG. 1 is not depicted in FIGS. 2 and 3 so as not to obscure to the figures. For example, the computer 10 is not illustrated in FIGS. 2 and 3 but is understood.

Turning to FIG. 2, in the case of the originating domain lacking an ESB (e.g., if domain A is without the ESB 24), the client application 25 needs to be modified to access the proxy (e.g., proxy 120) at the destination domain (e.g., domain B). Accordingly, the planning engine 105 is configured to modify the client application 25, to cause another software application (not shown) to modify the client application 25, and/or to direct the administrator how to modify the client application 25 to support accessing the proxy 120 in domain B. The registry 22 in the originating domain (domain A) needs to know about the proxy 120 in the destination domain (domain B), so the planning engine 105 adds the information for the proxy 120 in the registry 22 of domain A. In this case the federation policy 140 is effectively applied by the planning engine 105 inside the originating domain A (and not just between service domains A and B as shown in FIG. 1), because of the support (i.e., modification) required at the client application 25 doing the service invocation.

With reference to FIG. 3, even if the service domain hosting a service does not contain an ESB (e.g., if domain B is without the ESB 34), federation policies 140 may still be implemented by the planning engine 105. The policies 140 will affect the clients at the originating domain (e.g., such as the client application 25 in domain A), by making them use a proxy at the originating domain that fulfills the requirements of the federation policy 140 as illustrated in FIG. 3. However, the exchange of messages between the domains A and B is not affected, because the architect does not have the means to enforce how the invocations are to be received at the hosting domain (i.e., in the case, the architect cannot insert proxies, such as the proxy 120, at the hosting domain B according to the specified policies, and of course cannot modify the service $S_1$ itself). Accordingly, the planning engine 105 deploys the service proxy 110 in the ESB 24 of domain A and adds the information about the service proxy 110 to the registry 22 and the proxy 110 is configured to access the service $S_1$. The federation policy applies between the client 25 and the service proxy 110 in FIG. 3. In accordance with the present disclosure, these cases illustrated in FIGS. 1, 2, and 3 can be extended to multiple domains involved in a multi-hop service invocation.

As described herein, the planning engine 105 processes three records of information which are federation profiles, federation intents, and the current state of the federation. The current state of the federation includes all services and proxies for each known domain and the connectivity among them. Connectivity may include physical connections between proxies, between clients and proxies, and/or between clients and services. Federation profiles 130 and/or knowledge base 135 contain semantic information among service capabilities and proxy patterns.

Both federation intents 140 as well as service capabilities may be expressed as a set of policy assertions that are described in a machine readable form, for example, by a WS-Policy document. While such a policy document does not contain semantic information, its assertions are defined over a specific domain, for example a WS-Security policy. Each policy domain for which federation intents 140 are defined has an associated set of service proxies. For example, the WS-Security domain might contain proxies for integrity and authentication.

This allows for an approach to be implemented by the planning engine 105 as follows:

a) Semantic Enrichment: Upon reading a policy document, be it a federation intent 140 or a service capability, the planning engine 105 augments the policy document with a domain specific ontology. This mapping is directly derived from the policy file, such as a WSDL policy file. The ontology might be expressed in the Web Ontology Language (OWL) but other formats could be used as well and is part of the knowledge base 135. The domain specific ontology provides the information that is used by the planning engine 105 to reason about relationships and compatibility among and between functional domains. In addition, this provides the planning engine 105 with the information to map a federation intent 140 to a proxy pattern, i.e., to one or more proxies 110 and 120 that fulfill the federation intent 140.

b) Semantic Reasoning: Semantic reasoning is performed by the planning engine 105 over the set of proxy patterns and service capabilities. All proxy patterns associated with a single service (such as the service $S_1$) are compared to each other and checked whether the proxy patterns are compatible to one another and/or whether conflicts exist among the proxy patterns. Furthermore, proxy patterns are investigated by the planning engine for functional overlap and redundant proxy patterns are eliminated from the configuration plan. Then, non-functional service capabilities of the service are compared to the proxy patterns and checked whether incompatibilities exists. Finally, feature overlap with the non-functional service capabilities of the service are searched and eliminated if existent. A functional capability in a service is one that defines the service, and/or the functionality provided such as, for example, a service may return a ticket price, specified in US dollars. A non-functional capability is one that relates to how that service is implemented such as, for example, the service may serve at most 1,000 requests every minute.

c) Proxy Selection: The planning engine 105 maps the resulting proxy patterns to physical service proxy implementations (i.e., mapped to service proxies 110 and 120) and their corresponding configuration. Exemplary embodiments illustrate how a federation declaration on a given federation with some predefined semantics is realized as a configuration plan that describes the configuration of proxies added to the federation.

Further regarding the knowledge base 135, the planning engine 105 requires that semantic information (for semantic enrichment and semantic reasoning) is available in the knowledge base (database) 135 which may be separate and/or integrated with the federation profiles (database) 130. This knowledge base 135 may comprise the following parts:

1) Service capability base: The service capability base contains service capability descriptors (of services such as the service $S_1$) that describe individual, named capabilities such as "WSAddressing" and their relationship to other service capabilities. The relationship among service capabilities of services can be: a) orthogonal, meaning that these service capabilities can co-exist within the same service execution path; b) conflicting, meaning that these service capabilities cannot co-exist; and/or c) supporting, meaning that a given service capability also provides another service capability.

2) Proxy type base: The proxy type base contains proxy type descriptors that describe individual service proxies and service proxy patterns. A proxy type implements a set of service capabilities and thus links into the service capability base. In addition, each proxy type descriptor describes the relationship among proxy types and the relationship can be: a) orthogonal, meaning that these proxy types can co-exist within the same service access path; b) conflicting, meaning that two proxy types cannot co-exist in the same service execution path; c) inclusive, meaning that a given proxy type's functionality is also provided by another proxy type; and/or d) implicit, the reverse of inclusive, meaning that a given proxy type also provides the functionality of another proxy type. Many times, proxies implement service capabilities and thus the relationship among proxy types can be inferred from their provided service capabilities. Nevertheless, the planning engine 105 is configured to distinguish proxy type base from the service capability base since a capability like delegation cannot be a service capability of the service capability base. Accordingly, to implement a delegation, the planning engine 105 would need to deploy a proxy type, such as the service proxies 110 and 120, along with the service capability of the service $S_1$.

3) Descriptions of federations. This is a hierarchical structure of integrated domains, e.g., configured by the planning engine 105. The knowledge database 135 includes an application programming interface (API) that enables the creation, querying, and removal of objects in the federation. Services might be described by WSDL files for example but could also be identified by names. Similarly, policies might be given as WS-Policy files but could also be identified by a name only.

4) Rule Set: The knowledge base 135 also stores the rule set (R) that has been applied to a federation by, e.g., the planning engine 105. The rule set is associated with a federation description to which it should be applied.

5) Configuration Plan: The knowledge base 135 also stores the configuration plan that was generated by the planning engine 105 to implement the rule set. The configuration plan is associated with the rule set and the federation from which it was derived.

Figure 4:
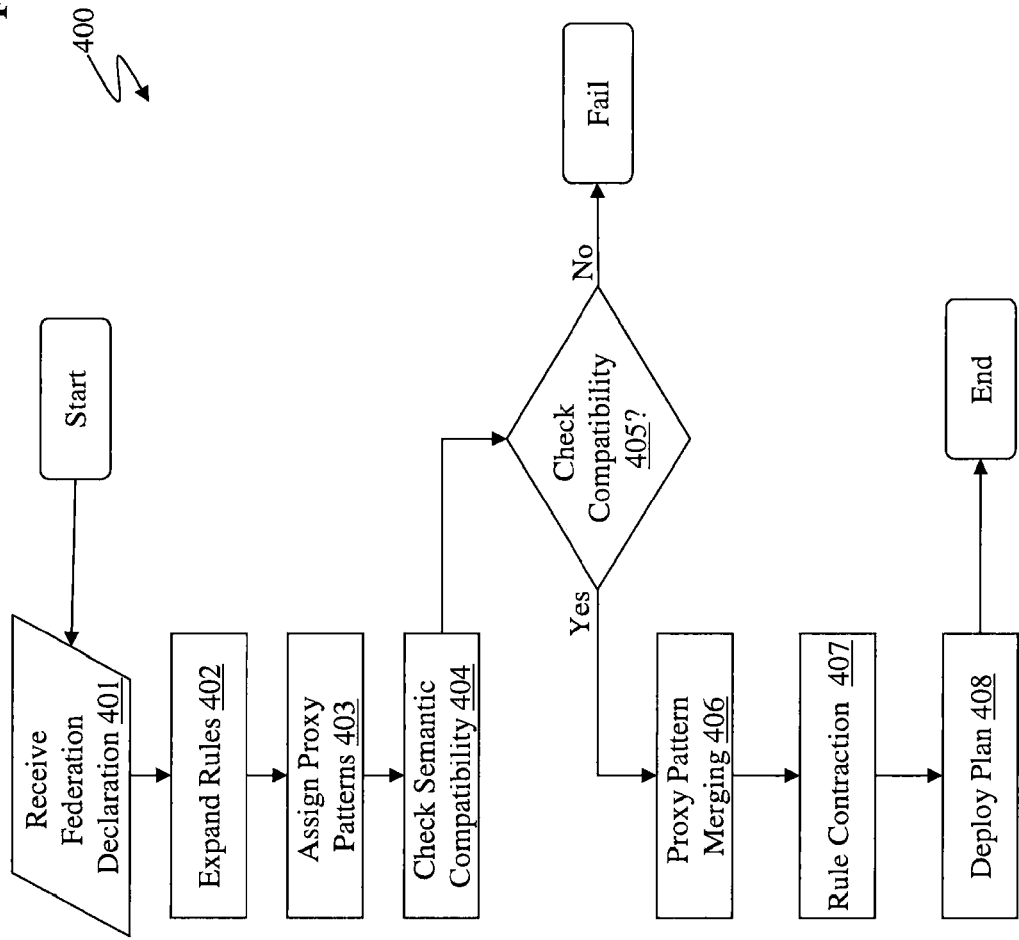
FIG. 4 illustrates a flow chart of a process in accordance with exemplary embodiments.

FIG. 4 illustrates a process 600 in accordance with exemplary embodiments. The planning engine 105 may be configured with a semantic planning algorithm to implement the process 600, which has been described herein.

For example, let F be a federation, $\Sigma$ the set of service instances in F, I the set of possible federation intents, $\Delta$ the set of domains in F, and $R=\{R_i\}_{i=0}^n$ the federation declaration 140 consisting of a set of rules.

At operation 401, the planning engine 105 is configured to read in the federation declaration (intents) 140. Each rule in the federation declaration R has the form: $R_i:=(S_i, I_i, D_i)$ where $S_i \subset \Sigma$, $I_i \subset I$, and $D_i \subset \Delta$. For each i all services in $S_i$ shall be made visible for the domains in $D_i$ with the properties defined by $I_i$.

The federation declaration 140 received by the planning engine 105 includes the desired services S, the predefined intents I, and the domains D to be connected. The service may be service $S_1$ and domain B provides the service $S_1$. The intent I may be for domain A to invoke (call) the service $S_1$ in domain B and the intent may specify that encryption and/or delegation be utilized for the connectivity between domains A and B. For example, when the planning engine 105 reads the declaration 140, there may be a rule in the declaration and intent 140 that requires all services in domain B to be available in domain A. The planning engine 105 reads the rule of the declaration 140 to determine that domain A, domain B, and service $S_1$ 150 are part of the rule. The planning engine 105 reads the registry 32 in domain B to determine that domain B executes the service $S_1$ 150.

Further, federation policies are intents 140 specified by the federation architect. Polices are part of the federation description, and federation policies may affect three aspects of the inter-domain interaction: policies 140 that define how the interaction with a service should be conducted, policies 140 that affect the visibility of a service on domains other than its own, and/or policies 140 that affect the service execution path routing. For example, a federation policy 140 may require that inter-domain service invocations are executed using reliable messaging. For example, a policy might require that service execution paths are always routed through a specific domain. The planning engine 105 may be configured to support arbitrary and generic federation policies 140, which may be considered a very complex task, so the planning engine 105 may require that policies 140 are enriched with semantic information so that the planning engine 105 can make implement the policies 140.

At operation 402, the planning engine 105 is configured to normalize rules. Each rule $R_i$ is expanded into a set of normalized rules $R_i^N$. The set of normalized rules is inferred from the cross product of the sets $S_i$ and $D_i$: $R_i^N:=\{R_{i,x}^N\}_{x \in S_i \times D_i}$. So a normalized rule has the form $R_{i,(s,d)}^N:=(s, I_i, d)\}$, $s \in S_i$, $d \in D_i$. Although a rule of the declaration 140 may include numerous domains and services, the planning engine 105 is configured to normalize the rule such that each normalized rule expresses how a single service (such as service $S_1$ 150) should be federated (integrated) to a specific domain (such as domain A). When queried by the planning engine 105, rules are rejected unless each referenced service and service domain exists and is known in the knowledge base 135. For example, if either one of domain A, domain B, or service $S_1$ were not in the knowledge base 135 when searched by the planning engine 105, the planning engine 105 would reject that particular rule of the declaration 140. Furthermore, the planning engine 105 resolves federation intents 140 by a lookup in the federation profile 130 and if unknown to the federation profile 130, the rule is rejected by the planning engine 105. The resulting normalized rules have to be unique. For each service/domain pair at most one rule may exist as the planning engine 105 uses the first-matching rule applies policy. Out of many different services and domains in the rule of the declaration 140, normalization by the planning engine 105 may specify, e.g., service $S_1$ 150 is to domain A, then encrypt.

At operation 403, the planning engine 105 is configured to execute assigning proxy patterns from the federation profiles 130 to implement each normalized rule determined in operation 402. For each normalized rule $R_{i,x}^N$ each federation intent $i \in I_i$ is mapped to a service proxy pattern. This is done by first mapping the intent 140 into a functional domain (such as domains A and B) and then searching the federation profile 135 for a proxy pattern that fits (matches) the federation intent 140, i.e., matches the rule. The semantic knowledge about functional domains (such as domains A and B) and the available proxy patterns is extracted (read) from the knowledge base 135.

The planning engine 105 may be configured such that it supports a limited number of federation intents 140 that describe non-functional aspects of service federation. These non-functional aspects are implemented by service proxies (such as services proxies 110 and 120) that augment the capabilities of the service (service $S_1$). The assigning process by the planning engine 105 results in simple proxy patterns, which are defined settings of at most two proxy types, where one proxy type (e.g., service proxy 120) is assigned to the service domain (such as domain B providing the service) and the other proxy type (e.g., service proxy 110) is assigned to the invocation domain (such as domain A invoking/calling the service in domain B). A proxy pattern as determined by the planning engine 105 can also contain an empty proxy type setting for one of the two domains and/or both of the domains, meaning that the planning engine 105 has determined that no proxy is needed to implement the desired service (e.g., service $S_1$) of the rule (of the declaration 140). Note that proxy patterns obtained from the federation profiles 130 (by the planner engine 105) define service proxies 110 and 120.

At operation 404, the planning engine 105 is configured to execute a semantic compatibility check based on semantic information in the knowledge base 135. The planning engine 105 is configured to check whether the specified federation intents 140 are consistent. Therefore, for each normalized rule, the planning engine 105 compares the proxy patterns (determined in operation 403) to each other for semantic incompatibilities as discussed above. The implementation does this by using proxy type descriptors. In other words, for a particular rule, the planning engine 105 compares the proxy type descriptors to determine semantic compatibility. Likewise, the planning engine 105 compares the proxy patterns (proxy type descriptors) to service capabilities using service capability descriptors. By comparing proxy type descriptors to service capability descriptors, the planning engine 105 utilizes this semantic information from the knowledge base 130 to determine the relationship among capabilities of services and proxies.

If one were to consider a naïve approach that directly maps each federation intent to a service proxy or service proxy pair, the naïve approach would be inadequate for at least two reasons: first, incompatible proxies and second, incompatibility between a proxy and service. The planning engine 105 is configured to determine incompatible proxies and (consequently) not output incompatible proxies, thus preventing a non-workable set-up which would result when the proxies that implement the functionality required by the federation intents 140 are not compatible with each other. For example, a security proxy (which encrypts service invocations from domain A) and a reliable messaging proxy (which ensures that invocations are delivered to the services in domain B) could be conflicting if the reliable messaging proxy 110 resends a lost message that is then interpreted by the security proxy 120 as a play-back attack. As such, the planning engine 105 is configured to prevent such a situation with incompatibility between, e.g., service proxy 110 and service proxy 120.

The planning engine 105 is also configured to determine incompatibility between a proxy and service and (consequently) not output an incompatibility between a proxy and service. A non-workable set-up results if one or more proxies are not compatible with the non-functional requirements of the service. For example, if a service $S_1$ mandates web-service addressing, then the planning engine 105 assures that proxy (such as proxy 110 and/or proxy 120) connecting to the service must also use web-service addressing, otherwise the service will not work reliably. As such, before deployment, the planning engine 105 assures that the service proxies 110 and 120 are compatible to the service $S_1$ 150.

If the planning engine 105 determines that proxy patterns and service capabilities within a normalized rule are not compatible in operation 405, then the planning process cannot continue.

At operation 406, the planning engine 105 is configured to implement proxy pattern merging to filter out proxy patterns that are redundant and/or to filter out proxy patterns that implement aspects already implemented by the service. For example, after the consistency of the intents 140 within a normalized rule have been checked, the planning engine 105 perform a proxy pattern merging operation that results in a complex proxy pattern that summarizes the requirements of the federation intents 140. A complex proxy pattern differs from a simple proxy pattern in the way that the complex proxy pattern describes a sequence of types indicating which proxies and how they have to be installed in a domain, instead of describing at most one proxy type per domain as in the simple proxy pattern case. A proxy type specifies a kind of proxy, based on the functionality that it provides. If the service already provides entirely all aspects of a proxy pattern and/or if a proxy pattern is redundant, the proxy pattern (i.e., the service proxy) is filtered out. Three steps may be implemented by the planning engine 105 for gaining a complex (providing) proxy pattern:

a) Merge all simple proxy patterns such that only orthogonal proxy patterns remain;

b) Check whether the remaining simple proxy patterns are supported proxy patterns; if they are not, find a supported proxy pattern that implements the smallest superset of capabilities that are required by the architect. A supported proxy pattern is one that is correct and can be constructed from the available proxy types.

c) For all remaining simple proxy patterns build in each domain a sequence of proxy types and thus form a complex proxy pattern. It is assumed that sometimes the architect might specify a combination of federation intents 140 that lead to a proxy pattern that is consistent from a logical point of view, but is not realizable in practice. For example, the outcome in step a) might be that the architect requires (at least) a delegation proxy (as, e.g., the proxy 110) at the invocation domain A and (at least) a security proxy (as, e.g., the proxy 110) at the service/provider domain B. Since it is not possible to connect a delegation proxy with a security proxy in practice, the planning engine 105 may initially determine that it will be necessary to instantiate a security proxy on both sides (i.e., in both domains A and B). This is not a problem, however, because during operation 406 the planning engine 105 is configured to determine that a security proxy also provides delegation and thus the requirements of the architect are realized by having the single delegation proxy (e.g., the delegation proxy 110 in the domain A without requiring an additional security proxy 110). The first two steps a) and b) might require more iterations by the planning engine 105, because after step b) the planning engine 105 might determine that it is possible to merge proxy patterns again. The merging in step a) has a different output than the construction of the complex pattern type. Merging simple patterns results again into simple patterns while the third step c) takes a set of simple patterns and results in a complex pattern. Hence, the third step c) utilizes different processing than the first step a).

Also in operation 406, the planning engine 105 is configured to determine and prevent proxy functionality overlap, because an inefficient setup results when proxies have overlapping capabilities. For example, if the declaration 140 asks for both delegation (a service proxy relaying service invocations like a gateway) as well as encryption, the planning engine 105 is configured to determine and install a security proxy (such as services proxies 110 and 120) that provides encryption since this proxy also implicitly provides delegation (the proxy has to process the service invocations, and thus relay them).

The planning engine 105 is configured to determine proxy and service functionality overlap and not deploy proxies having functionality overlap with the corresponding service. An inefficient setup results if one or more proxies overlap with the non-functional capabilities of the services. For example, if a service $S_1$ provides an encrypted binding and the federation architect asks in the declaration 140 for encrypted connectivity, then the planning engine 105 determines that no security proxy is needed (e.g., proxy 110 and/or proxy 120 is not needed) as the service $S_1$ can be accessed in a secure manner directly.

At operation 407, the planning engine 105 is configured to implement rule contraction, in which all rules that are associated with the same service are contracted. During operation 407, the planning engine 105 removes redundancies that occur when a service (such as the service $S_1$ 150) is invoked from multiple different domains (e.g., domains A, C, D, E, F, etc.). For example, the planning engine 105 removes multiple proxy patterns (which are service proxies) in the provider domain B since a single proxy pattern in domain B (such as the service proxy 120) can be shared by domains A, C, D, E, F, etc. (not shown) can be shared. In other words, the service $S_1$ in the domain B invoked by any of the domains A, C, D, E, F, etc., can be implemented by a singe service proxy 120 (without having a separate service proxy 120 for each different domain A, C, D, E, F, etc., invoking the service $S_1$).

Also, inside a domain, if multiple equal instances of a proxy exists whose role is to select one among a series of equivalent services those proxies have to be contracted too by the planning engine 105. For example, if, inside one domain A, there is more than one proxy selecting the closest available ticket price service, then just one of those proxies needs to be used.

At operation 408, the result of the planning engine 105 is a federation configuration plan that defines where services proxies 110 and 120 have to be installed, e.g., in domains A and B respectively and how they are to be configured (e.g., based on the assigned proxy patterns that fulfill the rule R of the declaration 140). For example, the proxy patterns are mapped to instance of services proxies (e.g., mapped to service proxies 110 and 120) to implement the proxy patterns as service proxies 110 and 120 in the domains A and B.

Figure 5:
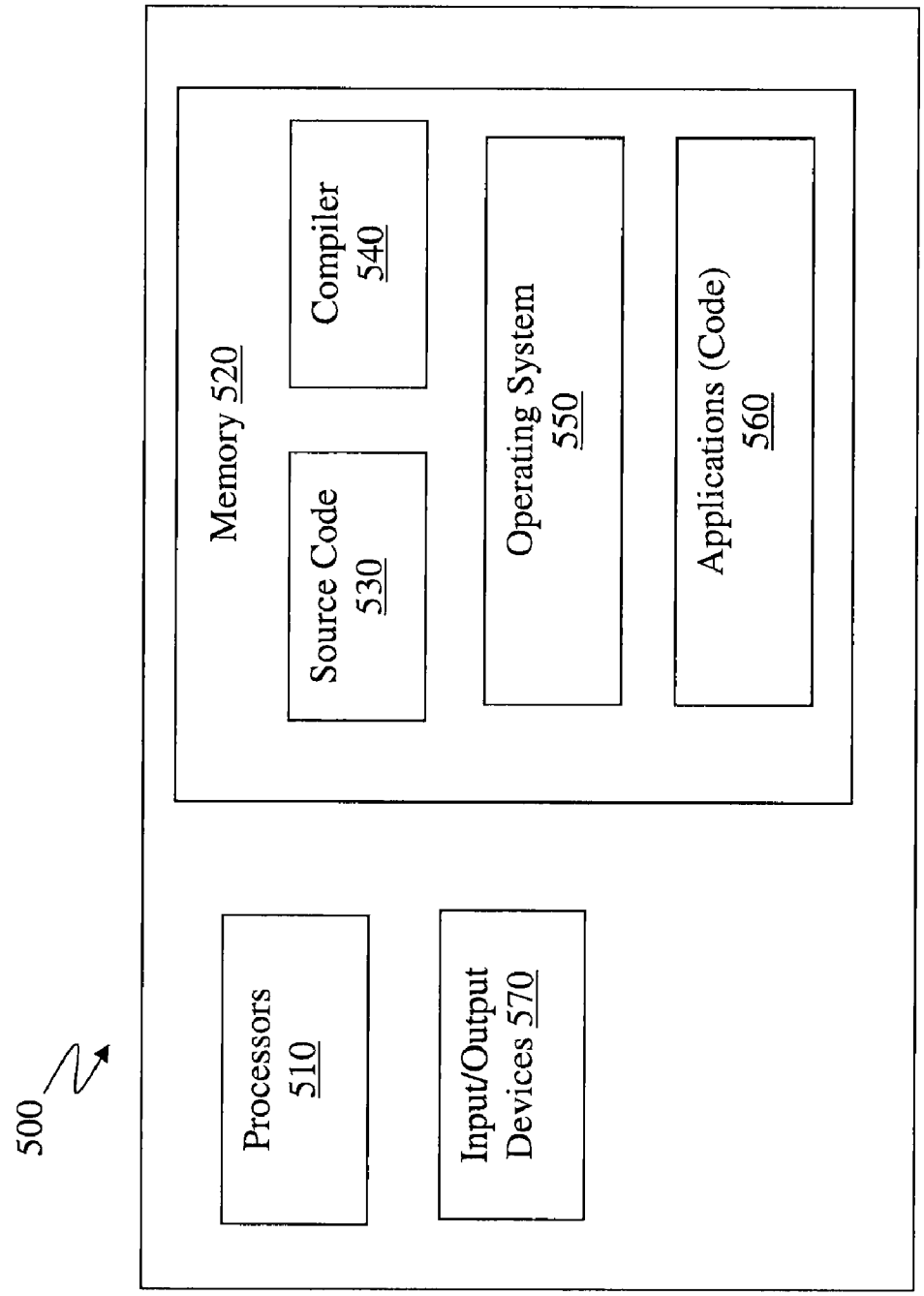
FIG. 5 illustrates an example of a computer having capabilities implemented in exemplary embodiments.

FIG. 5 illustrates an example of a computer 500 having capabilities, which may be included in exemplary embodiments. Various methods, procedures, modules, flow diagrams, and techniques discussed herein may also incorporate and/or utilize the capabilities of the computer 500. Moreover, capabilities of the computer 500 may be utilized to implement features exemplary embodiments discussed herein. One or more of the capabilities of the computer 500 may implement any element discussed herein, e.g., such as but not limited to elements in FIGS. 1-5.

Generally, in terms of hardware architecture, the computer 500 may include one or more processors 510, computer readable storage memory 520, and one or more input and/or output (I/O) devices 570 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 510 is a hardware device for executing software that can be stored in the memory 520. The processor 510 can be virtually any custom made or commercially available processor, a central processing unit (CPU), a data signal processor (DSP), or an auxiliary processor among several processors associated with the computer 500, and the processor 510 may be a semiconductor based microprocessor (in the form of a microchip) or a macroprocessor.

The computer readable memory 520 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cassette or the like, etc.). Moreover, the memory 520 may incorporate electronic, magnetic, optical, and/or other types of storage media. Note that the memory 520 can have a distributed architecture, where various components are situated remote from one another, but can be accessed by the processor 510.

The software in the computer readable memory 520 may include one or more separate programs, each of which comprises an ordered listing of executable instructions for implementing logical functions. The software in the memory 520 includes a suitable operating system (O/S) 550, compiler 540, source code 530, and one or more applications 160 of the exemplary embodiments. As illustrated, the application 560 comprises numerous functional components for implementing the features, processes, methods, functions, and operations of the exemplary embodiments. The application 560 of the computer 500 may represent numerous applications, agents, software components, modules, interfaces, controllers, etc., as discussed herein but the application 560 is not meant to be a limitation.

The operating system 550 may control the execution of other computer programs, and provides scheduling, input-output control, file and data management, memory management, and communication control and related services.

The application(s) 560 may employ a service-oriented architecture, which may be a collection of services that communicate with each. Also, the service-oriented architecture allows two or more services to coordinate and/or perform activities (e.g., on behalf of one another). Each interaction between services can be self-contained and loosely coupled, so that each interaction is independent of any other interaction.

Further, the application 560 may be a source program, executable program (object code), script, or any other entity comprising a set of instructions to be performed. When a source program, then the program is usually translated via a compiler (such as the compiler 540), assembler, interpreter, or the like, which may or may not be included within the memory 520, so as to operate properly in connection with the O/S 550. Furthermore, the application 560 can be written as (a) an object oriented programming language, which has classes of data and methods, or (b) a procedure programming language, which has routines, subroutines, and/or functions.

The I/O devices 570 may include input devices (or peripherals) such as, for example but not limited to, a mouse, keyboard, scanner, microphone, camera, etc. Furthermore, the I/O devices 570 may also include output devices (or peripherals), for example but not limited to, a printer, display, etc. Finally, the I/O devices 570 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 1070 also include components for communicating over various networks, such as the Internet or an intranet. The I/O devices 1070 may be connected to and/or communicate with the processor 105 utilizing Bluetooth connections and cables (via, e.g., Universal Serial Bus (USB) ports, serial ports, parallel ports, FireWire, HDMI (High-Definition Multimedia Interface), etc.).

When the computer 500 is in operation, the processor 510 is configured to execute software stored within the memory 520, to communicate data to and from the memory 520, and to generally control operations of the computer 500 pursuant to the software. The application 560 and the O/S 550 are read, in whole or in part, by the processor 510, perhaps buffered within the processor 510, and then executed.

When the application 560 is implemented in software it should be noted that the application 560 can be stored on virtually any computer readable storage medium for use by or in connection with any computer related system or method. In the context of this document, a computer readable storage medium may be an electronic, magnetic, optical, or other physical device or means that can contain or store a computer program for use by or in connection with a computer related system or method.

The application 560 can be embodied in any computer-readable medium 520 for use by or in connection with an instruction execution system, apparatus, server, or device, such as a computer-based system, processor-containing system, or other system that can fetch the instructions from the instruction execution system, apparatus, or device and execute the instructions. In the context of this document, a "computer-readable storage medium" can be any means that can store, read, write, communicate, or transport the program for use by or in connection with the instruction execution system, apparatus, or device. The computer readable medium can be, for example but not limited to, an electronic, magnetic, optical, or semiconductor system, apparatus, or device.

In exemplary embodiments, where the application 560 is implemented in hardware, the application 560 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It is understood that the computer 500 includes non-limiting examples of software and hardware components that may be included in various devices, servers, and systems discussed herein, and it is understood that additional software and hardware components may be included in the various devices and systems discussed in exemplary embodiments.

Further, as will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the exemplary embodiments of the invention have been described, it will be understood that those skilled in the art, both now and in the future, may make various improvements and enhancements which fall within the scope of the claims which follow. These claims should be construed to maintain the proper protection for the invention first described.

What is claimed is:

1. A method for automatically generating connectivity configuration between domains by a device, comprising:
   receiving a rule by the device;
   reading, by the device, the rule to determine a first domain of a first server invoking a service, to determine a second domain having the service in a second server, and to determine connectivity requirements for the first and second domains of the first and second servers respectively;
   based on an application in the first server needing to utilize the service in the second server, automatically determining, by the device, a first proxy to be assigned to the first server and a second proxy to be assigned to the second server to fulfill the rule; and
   automatically deploying, by the device, the first proxy to the first domain in the first server and the second proxy to the second domain in the second server;
   wherein the service is configured not to be made visible outside of the second domain but the second proxy related to the service is made visible outside of the second domain.

2. The method of claim 1, wherein automatically determining the first proxy and the second proxy to fulfill the rule by the device comprises the device:
   matching a first proxy pattern of the first proxy to the rule stored on the device, the rule being a federation intent; and
   matching a second proxy pattern of the second proxy to the rule;
   wherein the federation intent is a qualifier for connectivity between the application in the first domain and the service in the second domain;
   wherein based on the federation intent, based on definitions of a service capability of the service, based on the first and second proxy patterns in a federation profile, and based on semantic compatibility, the device determines and selects the first and second proxies to fulfill the federation intent;
   further comprising detecting, by the device, whether the service capability of the service is a superset of the federation intent; and
   determining, by the device, whether no service proxy is needed even when the service capability is expressed using a different syntax than the federation intent.

3. The method of claim 1,
wherein the first proxy and the second proxy are configured to fulfill connectivity requirements specified in the rule.

4. The method of claim 1, further comprising performing a semantic compatibility check.

5. The method of claim 4, wherein the semantic compatibility check comprises comparing the first proxy pattern to the second proxy pattern to determine if the first and second proxy patterns are semantically incompatible.

6. The method of claim 5, wherein in response to determining that the first and second proxy patterns are semantically incompatible, the device discontinues a configuration for the first and second domains.

7. The method of claim 4, wherein the semantic compatibility check comprises comparing both the first proxy pattern and the second proxy pattern to the service to determine if at least one of the first and second proxy patterns are semantically incompatible to the service.

8. The method of claim 7, wherein in response to determining that the at least one of the first and second proxy patterns are semantically incompatible to the service, the device discontinues a configuration for the first and second domains.

9. The method of claim 4, wherein a knowledge base stores semantic information for the semantic compatibility check.

10. The method of claim 2, further comprising determining if a functionally of any proxy pattern is redundant to the first proxy pattern; and
in response to functionally of the proxy pattern being redundant to the first proxy pattern, discarding the proxy pattern.

11. The method of claim 2, further comprising determining if a functionally of any proxy pattern is redundant to the second proxy pattern; and
in response to functionally of the proxy pattern being redundant to the second proxy pattern discarding the proxy pattern.

12. The method of claim 2, further comprising determining if the service is redundant to the first and second proxy patterns.

13. The method of claim 12, further comprising in response to the service being redundant to the first and second proxy patterns, discarding the first and second proxy patterns.

14. The method of claim 1, wherein the first and second domains represent a plurality of domains; and
wherein the first and second proxies represent a plurality of proxies.

15. A computing device configured to automatically generate connectivity configuration between domains, comprising:
memory for storing a program; and
a processor, functionally coupled to the memory, the processor being responsive to computer-executable instructions contained in the program and operative for:
receiving a rule;
reading the rule to determine a first domain of a first service invoking a service, to determine a second domain having the service in a second server, and to determine connectivity requirements for the first and second domains of the first and second servers respectively;
based on an application in the first server needing to utilize the service in the second server, automatically determining a first proxy to be assigned to the first server and a second proxy to be assigned to the second server to fulfill the rule; and
automatically deploying the first proxy to the first domain in the first server and the second proxy to the second domain in the second server;
wherein the service is configured not to be made visible outside of the second domain but the second proxy related to the service is made visible outside of the second domain.

16. The device of claim 15, wherein automatically determining the first proxy and the second proxy to fulfill the rule by the device comprises:
matching a first proxy pattern of the first proxy to the rule; and
matching a second proxy pattern of the second proxy to the rule.

17. The device of claim 15,
wherein the first proxy and the second proxy are configured to fulfill connectivity requirements specified in the rule.

18. The device of claim 15, further comprising performing a semantic compatibility check.

19. The device of claim 18, wherein the semantic compatibility check comprises comparing the first proxy pattern to the second proxy pattern to determine if the first and second proxy patterns are semantically incompatible.

20. A computer program product, on a non-transitory computer readable storage medium, the computer program product including instructions for causing a computer to execute a method for automatically generating connectivity configuration between domains by a device, comprising:
receiving a rule;
reading ,by the device, the rule to determine a first domain of a first server invoking a service, to determine a second domain having the service in a second server, and to determine connectivity requirements for the first and second domains of the first and second servers respectively;
based on an application in the first server needing to utilize the service in the second server, automatically determining by the device, a first proxy to be assigned to the first server and a second proxy to be assigned to the second server to fulfill the rule; and
automatically deploying, by the device, the first proxy to the first domain in the first server and the second proxy to the second domain in the second server;
wherein the service is configured not to be made visible outside of the second domain but the second proxy related to the service is made visible outside of the second domain.

* * * * *